(12) United States Patent
Shi et al.

(10) Patent No.: US 7,611,294 B2
(45) Date of Patent: Nov. 3, 2009

(54) ELECTRONIC APPARATUS WITH ORIENTATION ADJUSTABLE CAMERA

(75) Inventors: Zheng Shi, Shenzhen (CN); Jun Zhang, Shenzhen (CN); Chien-Li Tsai, Taipei Hsien (CN); Chun-Chi Liang, Taipei Hsien (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 325 days.

(21) Appl. No.: 11/558,458

(22) Filed: Nov. 10, 2006

(65) Prior Publication Data
US 2007/0110430 A1  May 17, 2007

(30) Foreign Application Priority Data
Nov. 14, 2005  (CN)  .................. 2005 2 0067923

(51) Int. Cl.
*G01B 17/02* (2006.01)
*H04N 5/225* (2006.01)

(52) U.S. Cl. .................. 396/428; 396/419; 348/207.1; 348/373

(58) Field of Classification Search .............. 396/419, 396/428, 429, 535, 541; 361/679, 683, 686, 361/679.01, 679.02, 679.04; 248/176.1, 248/187.1, 229; 348/207.1, 207.11, 373, 348/374, 375
See application file for complete search history.

(56) References Cited

U.S. PATENT DOCUMENTS

| 6,141,052 | A | 10/2000 | Fukumitsu et al. |
| 6,812,958 | B1 | 11/2004 | Silvester |
| 6,933,981 | B1 | 8/2005 | Kishida et al. |
| 7,256,987 | B2 * | 8/2007 | Weng .................. 361/679.55 |
| 7,324,152 | B2 * | 1/2008 | Yoon .................. 348/360 |
| 2004/0080667 | A1 * | 4/2004 | Jeong et al. .................. 348/374 |
| 2005/0276009 | A1 | 12/2005 | Kim |

* cited by examiner

*Primary Examiner*—Kenneth J Whittington
(74) *Attorney, Agent, or Firm*—Wei Te Chung

(57) ABSTRACT

An electronic apparatus includes a support body, a camera, and a shell pivotably attached to the support body around a first axis. The camera is pivotably received in the shell around a second axis which is perpendicular to the first axis. The camera includes a lens exposable from the shell.

10 Claims, 3 Drawing Sheets

ELECTRONIC APPARATUS WITH ORIENTATION ADJUSTABLE CAMERA

BACKGROUND OF THE INVENTION

1. Field of the Invention

The present invention relates to an electronic apparatus with a camera mounted thereon, and particularly to an electronic apparatus having an orientation adjustable camera.

2. Description of Related Art

The continuous development of communication network technologies and digital technologies has helped make digital cameras popular in people's network life. Generally, an electronic apparatus such as a portable computer has a digital camera mounted thereon. However, orientation of the digital camera on the portable computer cannot be adjusted, or can only be adjusted in a limited arrange, which is inconvenient.

What is needed is an electronic apparatus having an orientation adjustable camera.

SUMMARY OF THE INVENTION

An exemplary electronic apparatus includes a support body, a camera, and a shell pivotably attached to the support body around a first axis. The camera is pivotably received in the shell around a second axis which is perpendicular to the first axis. The camera includes a lens exposable from the shell.

Other advantages and novel features will become more apparent from the following detailed description when taken in conjunction with the accompanying drawings, in which:

DETAILED DESCRIPTION OF THE INVENTION

Figure 1:
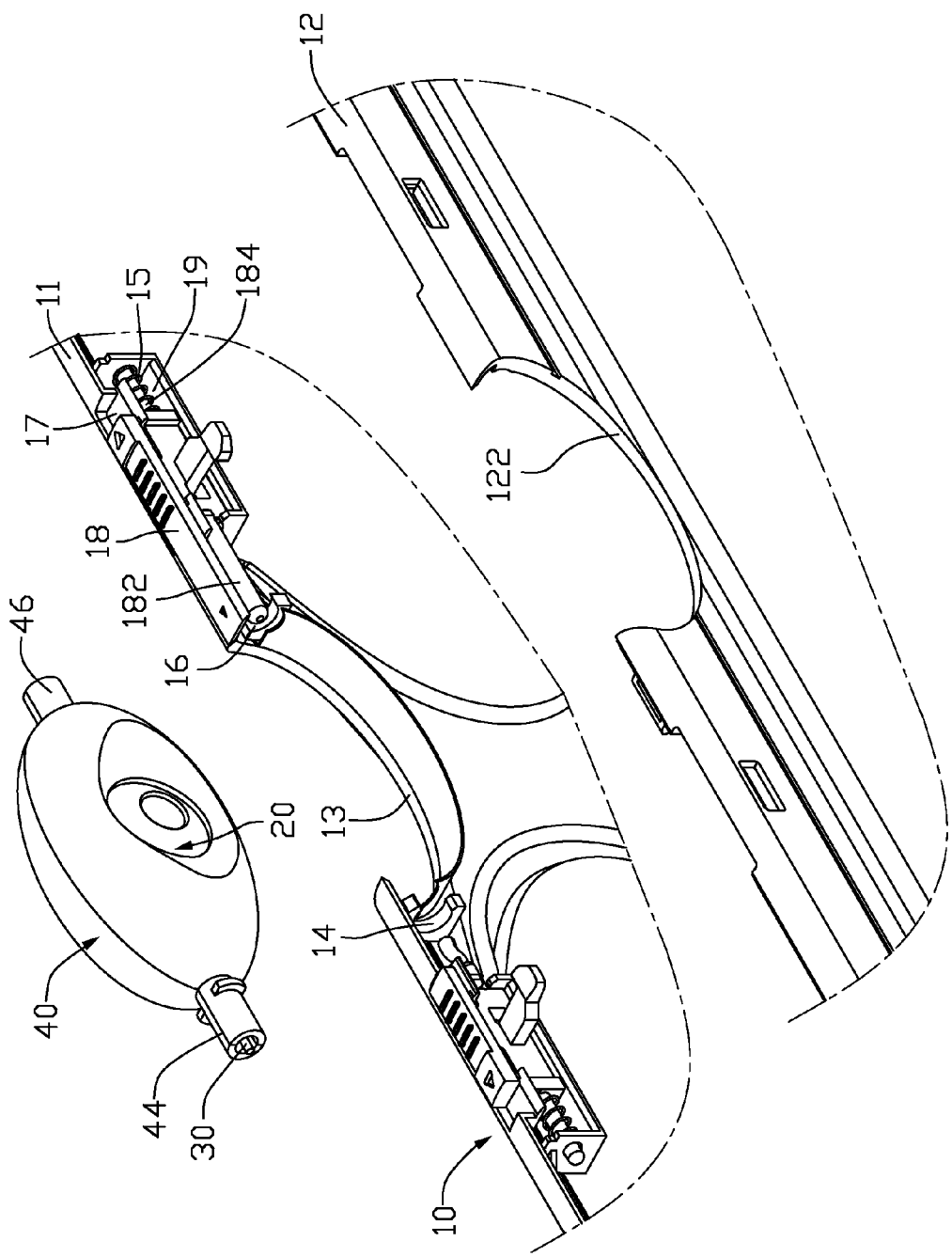
FIG. 1 is an exploded, isometric view of an electronic apparatus with a camera in accordance with a preferred embodiment of the present invention.

Referring to FIG. 1, an electronic apparatus in accordance with a preferred embodiment of the present invention includes a support body 10, a camera 20, a cable 30, and a shell 40. In this embodiment, the support body 10 is a cover unit of a notebook computer. The cover unit secures a liquid crystal display (LCD) panel, and is rotatable to cover a base unit of the notebook computer.

The support body 10 includes a first cover 11 and a second cover 12. In this embodiment, the first cover 11 is frame used for holding the LCD panel, and the second cover 12 is a hood covering the first cover 11.

The first cover 11 defines an arc-shaped cutout 13 in a free edge thereof. A first pivot hole 14 is defined in the first cover 11 at a left side of the cutout 13. A second pivot hole 16 is defined in the first cover 11 at a right side of the cutout 13, and in alignment with the first pivot hole 14. An elongated sliding slot 17 is defined in the free edge of the first cover 11 at the right side of the cutout 13. A locking member 18 is disposed in the sliding slot 17. In this embodiment, the locking member 18 comprises a hook which is used to lock the cover unit of the notebook computer to the base unit of the notebook computer. A column-shaped cantilevered latching portion 182 extends from an inner portion of the locking member 18 toward the cutout 13. A cantilevered post 184 extends from the inner portion of the locking member 18 in a direction opposite to the latching portion 182. A receiving chamber 19 is formed at the first cover 11 under the sliding slot 17. A right side of the receiving chamber 19 defines a hole to slidably receiving the post 184. A resilient element such as a coiled spring 15 is placed around the post 184. An end of the spring 15 abuts against the right side of the receiving chamber 19. The second cover 12 defines an arc-shaped cutout 122 corresponding to the cutout 13 of the first cover 11.

Figure 2:
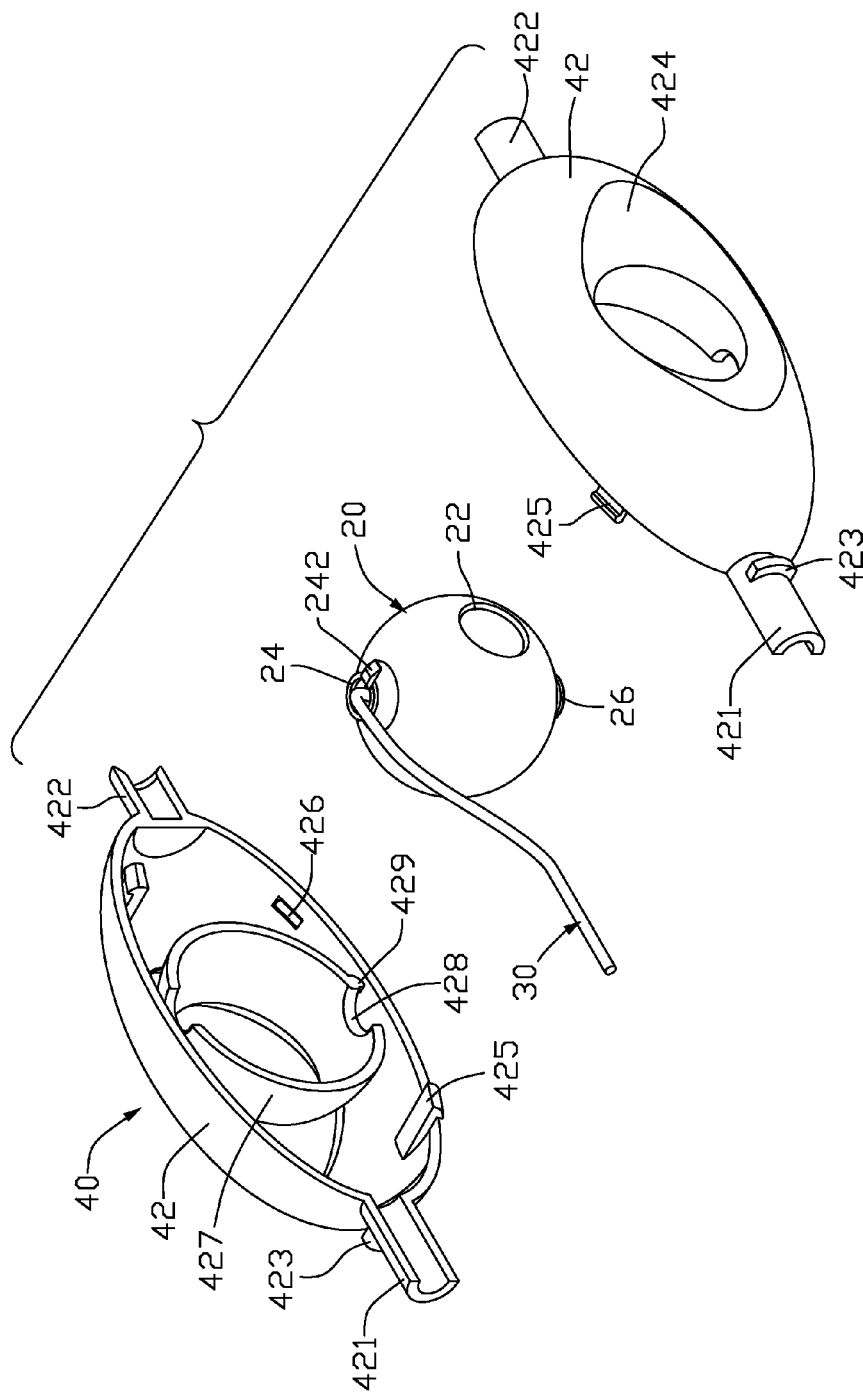
FIG. 2 is an exploded, isometric view of the camera of FIG. 1.

Referring also to FIG. 2, the camera 20 is generally sphere shaped. A lens 22 is disposed in the camera 20. A first tubular protrusion 24 and a second tubular protrusion 26 are formed on the camera 20 along a central axis of the camera 20. The lens 22 is exposed from a middle portion of the spherical surface of the camera 20 between the first and second tubular protrusions 24, 26. A block 242 is formed on an edge of the first tubular protrusion 24.

The shell 40 is generally oval-shaped, and is formed by two symmetric shell portions 42. Each shell portion 42 is generally semi-oval-shaped. A first semi-column shaft 421 and a second semi-column shaft 422 extend out from a left side and a right side of the shell portion 42, respectively. A block 423 is formed on the first shaft 421. A recess 424 is defined in an oval surface of each shell portion 42. The recess 424 is gradually enlarged from a bottom to the oval surface. A through hole is defined in the bottom of the recess 424. A semi-spherical accommodating portion 427 extends from an edge of the through hole. A pair of semi-circular cutouts 428 is defined in middle portions of upper and lower edges of the accommodating portion 427. A knob 429 is defined in an edge of one of the cutouts 428. Two hooks 425 and two locking notches 426 are formed at an edge portion of each shell portion 42, and in a cross-arrangement.

In assembly, the camera 20 is placed in the accommodating portion 427 of one of the shell portions 42. The first tubular protrusion 24 and a second tubular protrusion 26 are disposed in the semi-circular cutouts 428, respectively. The two shell portions 42 are then locked together with the hooks 425 of each shell portion 42 engaging in the locking notches 426 of the other shell portion 42. The camera 20 is thereby pivotally received in a spherical chamber formed by the two semi-spherical accommodating portions 427. The two semi-column shafts 421 forms a first shaft 44, and the two semi-column shafts 422 forms a second shaft 46.

Figure 3:
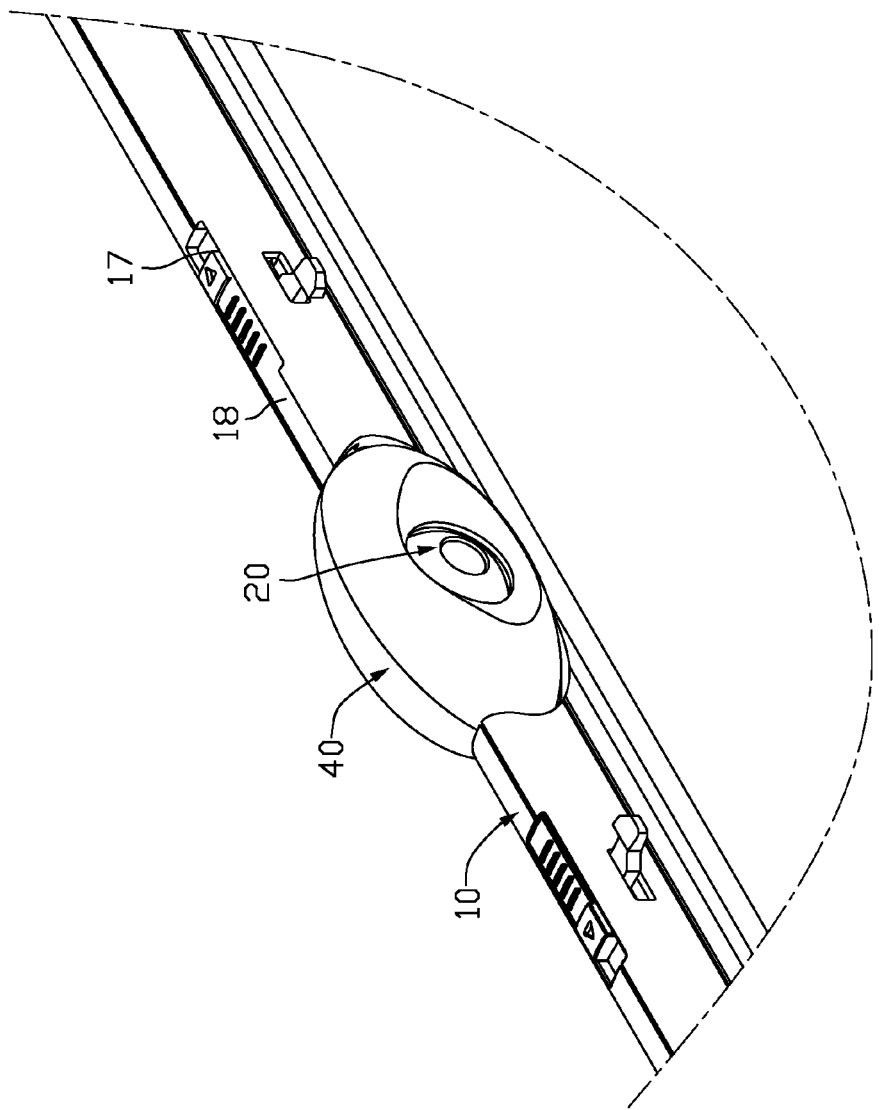
FIG. 3 is an assembled view of FIG. 1.

Referring also to FIG. 3, the locking member 18 is pushed to the rightmost side of the sliding slot 17. The first shaft 44 is placed in the first pivot hole 14 of the first cover 11, and the blocks 423 abut against the first pivot hole 14. The second shaft 46 is placed in the second pivot hole 16. The locking member 18 is then released, and returns to its original position via the restoring force of the spring 15. The latching portion 182 is inserted in the second shaft 46 of the shell 40. The first cover 11 is then attached to the second cover 12. The cable 30 extends through the first tubular protrusion 24 of the camera 20 and the first shaft 44 to thereby electrically link the camera 20 to the support body 10.

In use, moving the shell 40 with one finger can make the shell 40 with the camera 20 pivot around the first and second shafts 44, 46. Moving the camera 20 with one finger can make the camera 20 pivot relative to the shell 40 around the first and second tubular protrusions 24, 26. During the pivot process, the block 242 of the camera 20 can be blocked by the knobs 429 of the shell 40 so that rotation of the camera 20 is limited between the knobs 429. Thus, the camera 20 is multi-orientation adjustable.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. An electronic apparatus comprising:
    a support body;
    a camera; and
    a shell pivotably attached to the support body around a first axis, the shell comprising a recess in a middle portion thereof, a through hole defined in a bottom of the recess to expose the lens of the camera and a spherical accommodating chamber extending from an edge of the through hole of the shell to accommodate the camera, two tubular protrusions extending out from the camera along a second axis, the accommodating chamber of the shell defining two aligning holes to pivotably receive the tubular protrusions, the camera pivotably received in the shell around the second axis, the first axis being perpendicular to the second axis, the camera comprising a lens exposable from the shell.

2. The electronic apparatus as claimed in claim 1, wherein two shafts extends out from two opposite sides of shell, the support body comprises a cover defining a cutout in an edge thereof to receive the shell, the shafts of the shell are pivotably received in two pivot holes which are at two opposite sides of the cutout of the cover.

3. The electronic apparatus as claimed in claim 2, wherein one of the shafts of the shell forms a block blocked by one of the pivot holes of the cover, a locking member slidably attached to the cover via a resilient element includes a latching portion pivotably engaging with the other one of the shafts.

4. The electronic apparatus as claimed in claim 1, wherein a cable extends from the camera through one of the tubular protrusions and a hole of the shell, to electrically link the camera to the support body.

5. The electronic apparatus as claimed in claim 1, wherein the shell is formed by two symmetrical parts.

6. An electronic apparatus comprising:
    a support body defining a cutout and two pivot holes at two opposite sides of the cutout; and
    a camera module comprising a shell and a camera received in the shell, the shell formed by two symmetric separable parts fixed together, each of the parts defining a recess in a middle thereof, a bottom of the recess defining a through hole, a semi-spherical accommodating portion extending from an edge of the through hole to accommodate the camera, a pair of cutouts defined in an upper edge and a lower edge of the accommodating portion, the camera comprising a lens exposable from the through holes of the parts and two tubular protrusions extending out from two opposite sides of the camera to engage in the cutouts of the accommodating portion, the shell comprising two shafts extending out from two opposite sides thereof, the shafts pivotably received in the pivot holes of the support body, the camera pivotably received in the shell around an axis which is angled from the shafts, so that the camera is multi-orientation adjustable.

7. The electronic apparatus as claimed in claim 6, wherein one of the shafts of the shell is hollow and communicates outer and inner spaces of the shell, a cable extends from the camera through one of the tubular protrusions and said one of the shafts.

8. The electronic apparatus as claimed in claim 6, wherein the recess is gradually enlarged from the bottom to an outer surface of each of the parts of the shell.

9. The electronic apparatus as claimed in claim 6, wherein a locking member is slidably attached to the support body via a resilient element and includes a latching portion releasably engaging with one of the shafts of the shell.

10. The electronic apparatus as claimed in claim 6, wherein the support body is a cover unit of a portable computer, the cutout for accommodating the shell is defined in an edge of the cover unit.

* * * * *